United States Patent
Hoshina et al.

(10) Patent No.: US 9,644,728 B2
(45) Date of Patent: May 9, 2017

(54) STRAIN WAVE DEVICE

(71) Applicant: HARMONIC DRIVE SYSTEMS INC., Shinagawa-ku, Tokyo (JP)

(72) Inventors: Tatsuro Hoshina, Azumino (JP); Masakatsu Sasahara, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 57 days.

(21) Appl. No.: 14/649,082

(22) PCT Filed: Sep. 24, 2013

(86) PCT No.: PCT/JP2013/075729
§ 371 (c)(1),
(2) Date: Jun. 2, 2015

(87) PCT Pub. No.: WO2015/045008
PCT Pub. Date: Apr. 2, 2015

(65) Prior Publication Data
US 2015/0316134 A1 Nov. 5, 2015

(51) Int. Cl.
*F16H 49/00* (2006.01)
*F16H 1/32* (2006.01)

(52) U.S. Cl.
CPC ............ *F16H 49/001* (2013.01); *F16H 1/32* (2013.01); *F16H 2049/003* (2013.01); *Y10T 74/19* (2015.01)

(58) Field of Classification Search
CPC ............................... F16H 49/00; F16H 49/001
USPC ......................................................... 74/640
See application file for complete search history.

(56) References Cited

U.S. PATENT DOCUMENTS

| | | | | |
|---|---|---|---|---|
| 4,003,272 A | * | 1/1977 | Volkov | F16H 49/001 74/640 |
| 2011/0245006 A1 | * | 10/2011 | Negishi | B25J 9/1025 475/149 |

FOREIGN PATENT DOCUMENTS

| | | |
|---|---|---|
| JP | 58-196349 A | 11/1983 |
| JP | 59-190541 A | 10/1984 |
| JP | 61-11047 U | 1/1986 |
| JP | 64-049737 A | 2/1989 |
| JP | 05-27398 U | 4/1993 |

(Continued)

OTHER PUBLICATIONS

International Searching Report (PCT/ISA/210 mailed on Dec. 17, 2013, by the Japanese Patent Office as the International Searching Authority for International Application No. PCT/JP2013/075729.

*Primary Examiner* — William C Joyce
(74) *Attorney, Agent, or Firm* — Buchanan Ingersoll & Rooney PC

(57) ABSTRACT

First and second external tooth gear parts of a strain wave gearing are bent in an elliptic shape by a wave generator to engage with first and second internal tooth gears, respectively. The first and second external tooth gear parts are bent so as to have elliptic shapes the phases of which are rotated 90 degrees from each other about a rotational center line. A coupling external tooth gear part that maintains a circular cross-sectional shape which does not deform is formed in between the first and second external tooth gear parts. The coupling external tooth gear part is maintained so as to be coupled with a coupling internal tooth gear in an engaged manner. The strain wave gearing has high engagement rigidity and is capable of transmitting large torque.

8 Claims, 4 Drawing Sheets

(56) References Cited

FOREIGN PATENT DOCUMENTS

| JP | 2009-156462 A | 7/2009 |
|----|---------------|--------|
| JP | 2013-174315 A | 9/2013 |

* cited by examiner

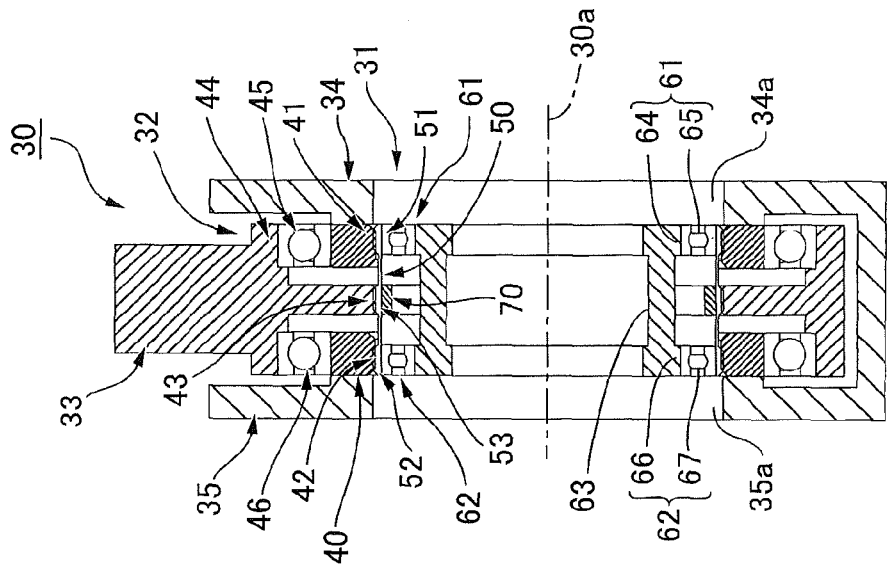
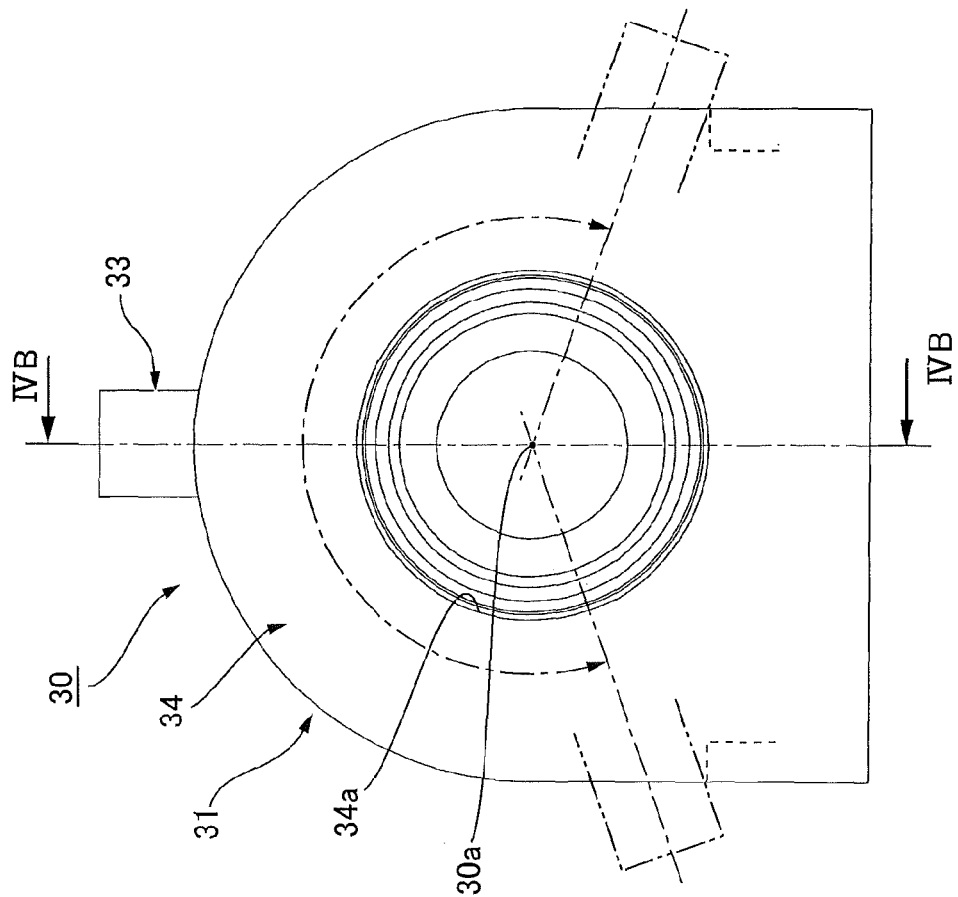

STRAIN WAVE DEVICE

TECHNICAL FIELD

The present invention relates to a flat strain wave gearing capable of transmitting large torque.

BACKGROUND ART

A strain wave gearing is configured from a rigid internally toothed gear, a flexible externally toothed gear capable of flexing in a radial direction, and a wave generator. Unlike a gear drive composed of a combination of normal rigid gears, a strain wave gearing has no backlash and can yield a large reduction ratio in one stage. The flat strain wave gearing comprising a cylindrical externally toothed gear disclosed in Patent Document 1 is a known example of a typical strain wave gearing.

A flat strain wave gearing comprises two rigid internally toothed gears disposed coaxially and in parallel, a cylindrical flexible externally toothed gear capable of meshing with these internally toothed gears, and a wave generator that causes the externally toothed gear to flex into an ellipsoidal shape and mesh with both internally toothed gears. One first internally toothed gear and the externally toothed gear have the same number of teeth, and the other second internally toothed gear has 2n (n being a positive integer) more teeth, usually two more.

When the wave generator is driven by a motor while the second internally toothed gear having more teeth is secured so as to not rotate, relative rotation corresponding to the difference in the number of teeth is produced in the externally toothed gear. The other first internally toothed gear has the same number of teeth as the externally toothed gear and rotates integrally with the externally toothed gear. Consequently, the rotation of the externally toothed gear is outputted from the first internally toothed gear to a load side.

PRIOR ART DOCUMENTS

Patent Documents

[Patent Document 1] JP-A 2009-156462

SUMMAREY OF THE INVENTION

Problems to Be Solved by the Invention

A strain wave gearing comprises an externally toothed gear that must be able to elastically deform. Therefore, a strain wave gearing has inferior holding rigidity relative to when rigid gears are meshed together, and large transmission torque cannot always be ensured.

An object of the present invention is to provide a strain wave gearing capable of transmitting greater torque than a conventional flat strain wave gearing.

Means Used to Solve the Above-Mentioned Problems

The strain wave gearing of the present invention is characterized in comprising:
a tube body capable of flexing in a radial direction;
a first externally toothed gear portion and a second externally toothed gear portion formed in the tube body in sections set apart along the direction of a center axis of the tube body;
a coupling externally toothed gear portion formed in the tube body between the first externally toothed gear portion and the second externally toothed gear portion in the direction of the center axis;
a wave generator causing the tube body to flex in the radial direction so that the coupling externally toothed gear portion has a circular cross-sectional shape and the first and second externally toothed gear portions have a non-circular cross-sectional shape;
a first internally toothed gear with which the first externally toothed gear portion flexed by the wave generator is partially meshed;
a second internally toothed gear with which the second externally toothed gear portion flexed by the wave generator is partially meshed; and
a coupling internally toothed gear meshingly linked with the coupling externally toothed gear portion.

In the tube body made to flex by the wave generator, the first and second externally toothed gear portions are made to flex into a non-circular cross-sectional shape, and are partially meshed with the first and second internally toothed gears, respectively. The coupling externally toothed gear portion takes on a circular cross-sectional shape (or maintains a circular cross-sectional shape) and maintains the meshed linking with the coupling internally toothed gear through the entire periphery. Consequently, the meshing rigidity of the strain wave gearing can be increased, and a greater amount of transmitted torque can be transmitted via the flexible tube body.

Commonly, the first and second externally toothed gear portions are made to flex into an ellipsoidal shape by the wave generator. In this case, the first externally toothed gear portion is made to flex into a shape conforming to a first ellipsoidal curve by the wave generator, and the second externally toothed gear portion is made to flex into a shape conforming to a second ellipsoidal curve by the wave generator. The major axis position of the second ellipsoidal curve is rotated 90 degrees about the center of the center axis relative to the major axis position of the first ellipsoidal curve.

In this case, preferably, the first and second externally toothed gear portions are equidistant from the coupling externally toothed gear portion in the direction of the center axis, the first externally toothed gear portion is made to flex into a shape conforming to an ellipsoidal curve by the wave generator, and the second externally toothed gear portion is made to flex into a shape conforming to the ellipsoidal curve rotated 90 degrees about the center of the center axis by the wave generator.

The first and second externally toothed gear portions on both sides of the flexible tube body are made to flex into the same ellipsoidal cross-sectional shape with a difference in phase of 90 degrees, and are meshed with the first and second internally toothed gears. As a result, the coupling externally toothed gear portion positioned between the first and second externally toothed gear portions can be held in a circular cross-sectional shape.

In order to make the first and second externally toothed gear portions flex into ellipsoidal shapes as described above, the wave generator comprises a first wave generator and a second wave generator linked to each other so as to rotate integrally, the profile shape of the first wave generator being defined by the first ellipsoidal curve, and the profile shape of the second wave generator being defined by the second ellipsoidal curve.

When the flexible externally toothed gear is made to flex into an ellipsoidal shape, and the number of teeth of the first internally toothed gear and the second internally toothed gear is designated as a first number of teeth, the number of teeth of the first externally toothed gear portion and the second externally toothed gear portion is designated as a second number of teeth 2n (n being a positive integer) fewer than the first number of teeth. When the strain wave gearing is used as a reducer, the first and second wave generators are used as rotation input elements. If the first and second internally toothed gears are secured so as to not rotate, the coupling internally toothed gear serves as a reduced-rotation output element. Conversely, if the coupling internally toothed gear is secured so as to not rotate, the first and second internally toothed gears serve as reduced-rotation output elements.

The first and second externally toothed gear portions and the coupling externally toothed gear portion can be formed individually and separated in the direction of the center axis. Another possibility instead is to use the portions on both in tooth-trace-direction sides of the external teeth formed in the external peripheral surface of the tube body as the first and second externally toothed gear portions, and to use the middle portion in tooth-trace-direction as the coupling externally toothed gear portion.

Preferably, a backup ring for supporting the coupling externally toothed gear portion from the inner side is included in order to increase the meshed linking strength between the coupling externally toothed gear portion and the coupling internally toothed gear.

BRIEF DESCRIPTION OF THE DRAWINGS

FIG. 4A and 4B include an end surface view and a schematic longitudinal cross-sectional view of the arm-turning mechanism of FIG. 3

MODE FOR CARRYING OUT THE INVENTION

An embodiment of a strain wave gearing to which the present invention is applied is described with reference to the drawings.

(Embodiment 1)

Figure 1:
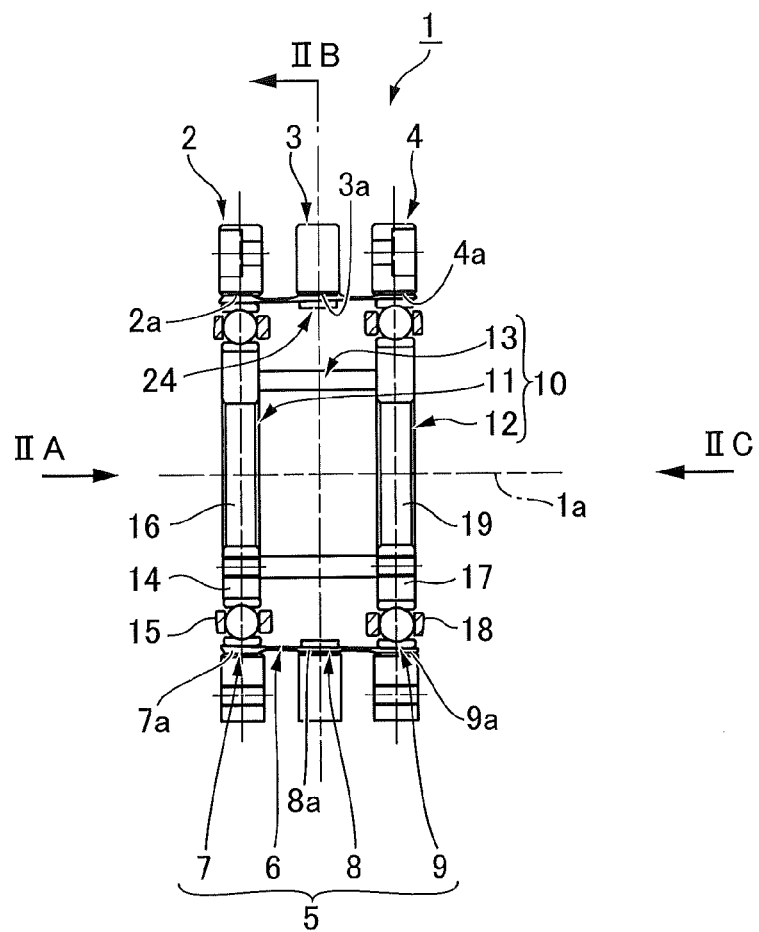
FIG. 1 is a schematic longitudinal cross-sectional view of a strain wave gearing according to Embodiment 1 of the present invention.
Figure 2A:
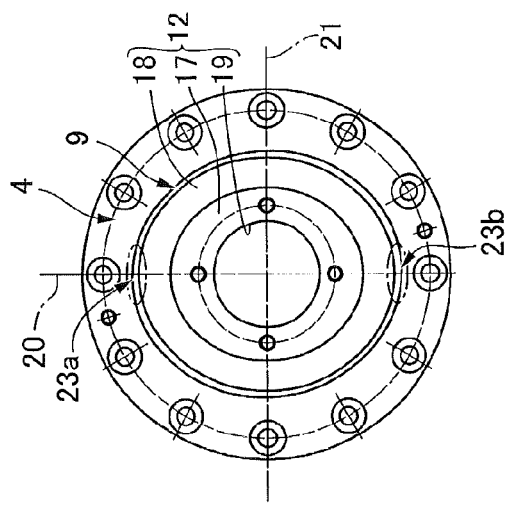
FIG. 2A-2C show the strain wave gearing of FIG. 1 including a view of one end surface, an explanatory drawing showing a longitudinal cross section of the axial-direction middle, and a view of the other end surface.
Figure 2B:
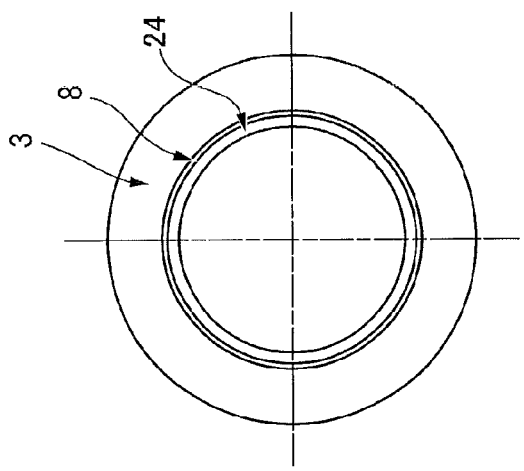
Figure 2C:
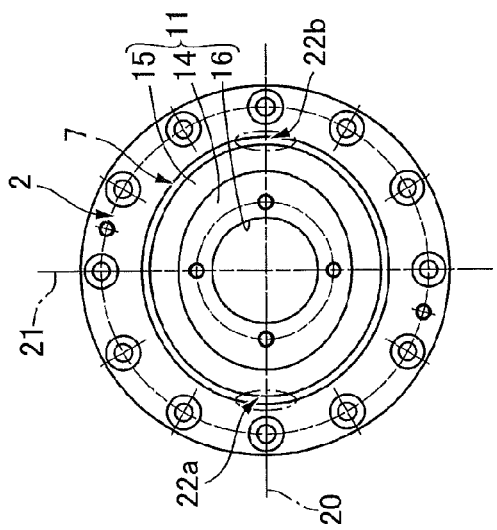

FIG. 1 is a schematic longitudinal cross-sectional view showing a strain wave gearing according to Embodiment 1. FIG. 2(A) is an end surface view when the strain wave gearing is viewed from the side of arrow IIA in FIG. 1, FIG. 2(B) is an explanatory drawing showing a cross section when the strain wave gearing is sectioned through the center position IIB along a gearing axis in FIG. 1, and FIG. 2(C) is an end surface view when the strain wave gearing is viewed from the side of arrow IIC in FIG. 1.

A strain wave gearing 1 comprises, as rigid internally toothed gears, an annular first internally toothed gear 2, an annular coupling internally toothed gear 3, and an annular second internally toothed gear 4. The internally toothed gears 2 to 4 are disposed coaxially in the stated order along their rotational center axis 1a. The coupling internally toothed gear 3 is positioned in the middle between the first and second internally toothed gears 2, 4 in the direction of the rotational center axis 1a.

A flexible externally toothed gear 5 is coaxially disposed on the inner sides of the internally toothed gears 2 to 4. The flexible externally toothed gear 5 comprises a cylindrical body 6 capable of flexing in the radial direction. A first external teeth 7a, coupling external teeth 8a, and second external teeth 9a are formed in the stated order in the circular external peripheral surface of the cylindrical body 6, at fixed intervals along the direction of the rotational center axis 1a.

The portion of the cylindrical body 6 where the first external teeth 7a are formed is a first externally toothed gear portion 7. The first externally toothed gear portion 7, which faces the first internally toothed gear 2 from the inside, is capable of meshing with the internal teeth 2a of the first internally toothed gear 2. The portion of the cylindrical body 6 where the coupling external teeth 8a are formed is a coupling externally toothed gear portion 8. The coupling externally toothed gear portion 8, which faces the coupling internally toothed gear 3 from the inside, is meshingly linked with the internal teeth 3a of the coupling internally toothed gear 3. The portion of the cylindrical body 6 where the second external teeth 9a are formed is a second externally toothed gear portion 9. The second externally toothed gear portion 9, which faces the second internally toothed gear 4 from the inside, is capable of meshing with the internal teeth 4a of the second internally toothed gear 4.

A wave generator 10 is coaxially disposed on the inner side of the flexible externally toothed gear 5. The wave generator 10 comprises a first wave generator 11 and a second wave generator 12. The first and second wave generators 11, 12 are coaxially linked by a linking member 13 so as to rotate integrally. The first wave generator 11 is fitted into the inner side of the first externally toothed gear portion 7 in the flexible externally toothed gear 5, and the second wave generator 12 is fitted into the inner side of the second externally toothed gear portion 9 in the flexible externally toothed gear 5.

The first wave generator 11 comprises a rigid plug 14 and a wave bearing 15 mounted on the external peripheral surface thereof. The profile shape of the rigid plug 14 is an ellipsoidal curve. The wave bearing 15 is a ball bearing comprising an inner race and an outer race which are capable of flexing in the radial direction. The profile shape of the outer race in contact with the inner peripheral surface of the first externally toothed gear portion 7 is the same ellipsoidal curve as the rigid plug 14. Therefore, the first externally toothed gear portion 7 in which the first wave generator 11 is fitted is made to flex into a shape conforming to the ellipsoidal curve. The first externally toothed gear portion 7 flexed into an ellipsoidal shape meshes with the first internally toothed gear 2 at both ends of the major axis of the ellipse. A center through-hole 16 linking an input rotation shaft (not shown) is formed in the rigid plug 14.

The other second wave generator 12 has the same structure, comprising a rigid plug 17 and a wave bearing 18, and having a center through-hole 19 formed in the rigid plug 17. The second externally toothed gear portion 9 into which the second wave generator 12 is fitted is made to flex into a shape conforming to the ellipsoidal curve. The second externally toothed gear portion 9 flexed into an ellipsoidal shape is meshed with the second internally toothed gear 4 at both ends of the major axis of the ellipse.

The ellipsoidal profile shape of the first wave generator 11 and the ellipsoidal profile shape of the second wave generator 12 are the same, but the phases of the two ellipsoidal profile shapes are rotated 90 degrees from each other about the rotational center axis 1a. Specifically, the major axis positions of the two ellipsoidal profile shapes are in positions rotated 90 degrees relative to each other about the rotational center axis 1a. Therefore, the first externally toothed gear portion 7 and the second externally toothed gear portion 9, having flexed into shapes conforming to the ellipsoidal curve, are also made to flex into shapes conforming to the respective ellipsoidal curves with their phases rotated 90 degrees from each other about the rotational center axis 1a.

The first externally toothed gear portion 7 is made to flex into a shape conforming to the ellipsoidal curve so that the transverse axis is the major axis 20 and the longitudinal axis is the minor axis 21, as shown in FIG. 2(A). The second externally toothed gear portion 9 is made to flex into a shape conforming to the ellipsoidal curve so that the transverse axis is the minor axis 21 and the longitudinal axis is the major axis 20, as shown in FIG. 2(C). Consequently, the meshing positions 23a, 23b between the second externally toothed gear portion 9 and the second internally toothed gear 4 are positioned as being rotated 90 degrees about the rotational center axis 1a from the meshing positions 22a, 22b between the first externally toothed gear portion 7 and the first internally toothed gear 2.

The cylindrical body 6 of the flexible externally toothed gear 5 remains a perfect circle without deforming in the middle position IIB between the first externally toothed gear portion 7 and the second externally toothed gear portion 9 in the direction of the rotational center axis 1a, as shown in FIG. 2(B). The coupling externally toothed gear portion 8 is formed in a portion of the cylindrical body 6 that includes this perfectly circular portion. Consequently, the coupling externally toothed gear portion 8 remains meshingly linked through the entire periphery with the coupling internally toothed gear 3, which has a corresponding pitch diameter.

A fixed-width backup ring 24 is fitted into the inner peripheral surface portion of the coupling externally toothed gear portion 8 in the cylindrical body 6. The meshed linking of the coupling externally toothed gear portion 8 and the coupling internally toothed gear 3 is held and the linking force therebetween is strengthened by the backup ring 24.

The numbers of teeth of the gears of the strain wave gearing 1 are set, for example, as follows. The number of teeth Z(2) of the first internally toothed gear 2 and the number of teeth Z(4) of the second internally toothed gear 4 are the same. The number of teeth Z(7) of the first externally toothed gear portion 7 and the number of teeth Z(9) of the second externally toothed gear portion 9 are the same. The numbers of teeth Z(7), Z(9) are 2n (n being a positive integer) fewer than the number of teeth Z(2), Z(4) of the first and second internally toothed gears 2, 4. The number of teeth Z(3) of the coupling internally toothed gear 3 is the same as the number of teeth Z(8) of the coupling externally toothed gear portion 8. For example, the numbers of teeth Z(3), Z(8) are the same as the numbers of teeth Z(7), Z(9) of the first and second externally toothed gear portions 7, 9.

When the strain wave gearing 1 thus configured is used as a reducer, the first and second wave generators 11, 12, which are rotation input elements, are linked to an input rotation shaft (not shown) such as a motor shaft. In this case, for example, the first and second internally toothed gears 2, 4 are secured so as to not rotate. The coupling internally toothed gear 3, which is a reduced-rotation output element, is linked to a load-side member (not shown).

When the first and second wave generators 11, 12 rotate at a high speed, the meshing positions of the first internally toothed gear 2 and the ellipsoidally flexed first externally toothed gear portion 7 in the flexible externally toothed gear 5, and the meshing positions of the second externally toothed gear portion 9 and the second internally toothed gear 4, move synchronously in the same circumferential direction. As a result, the flexible externally toothed gear 5 rotates at a relative rotational speed corresponding to the difference in the number of teeth, in relation to the secured first and second internally toothed gears 2, 4. Because the coupling externally toothed gear portion 8 of the flexible externally toothed gear 5 is meshingly linked with the coupling internally toothed gear 3, the coupling internally toothed gear 3 rotates integrally with the flexible externally toothed gear 5. Consequently, the rotation of the flexible externally toothed gear 5 is outputted to the load side via the coupling internally toothed gear 3.

By contrast, when the coupling internally toothed gear 3 is fixed so as to not rotate, the first and second internally toothed gears 2, 4 serve as reduced-rotation output elements. One or both of these gears are linked to a load-side member (not shown).

(Embodiment 2)

Figure 3:
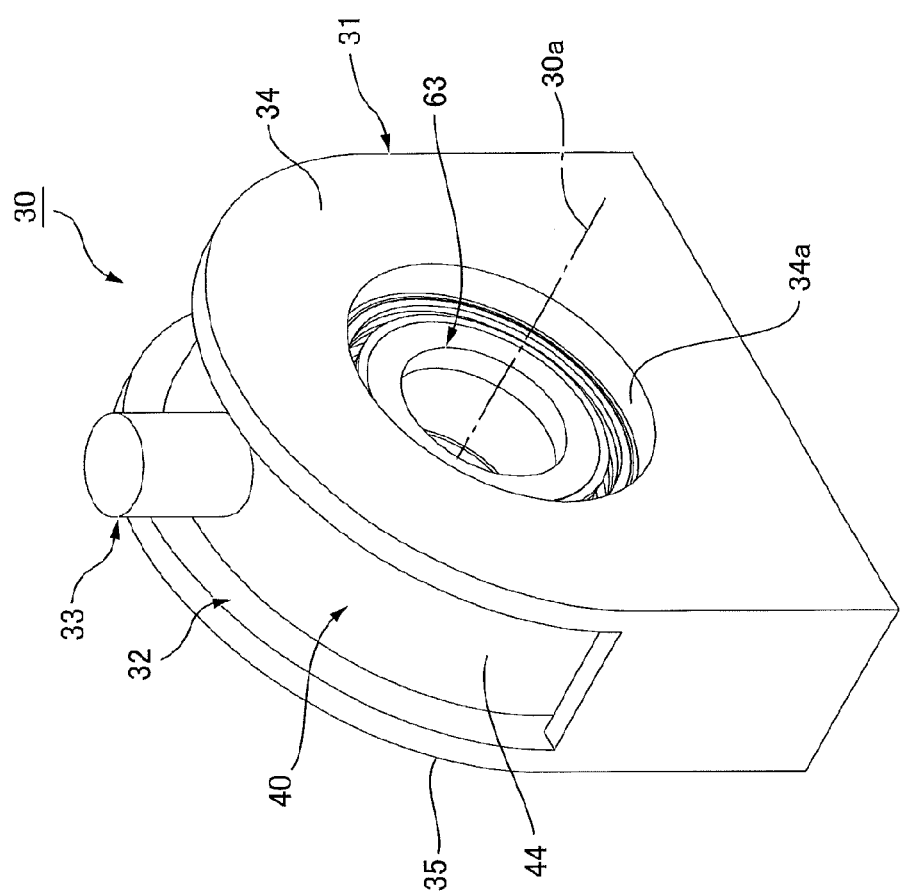
FIG. 3 is a perspective view of an arm-turning mechanism according to Embodiment 2 of the present invention.

FIG. 3 is a perspective view showing an arm-turning mechanism incorporating a strain wave gearing to which the present invention is applied. FIG. 4(A) is an end surface view of the arm-turning mechanism, and FIG. 4(B) is a schematic longitudinal cross-sectional view of the same.

An arm-turning mechanism 30 comprises a casing 31, and an opening 32 is formed over an angular range of at least 180 degrees in the arcuate top surface of the casing 31. A columnar turning arm 33 protrudes upward from the opening 32. The turning arm 33 can be turned within a predetermined angular range along the opening 32 by a strain wave gearing 40 housed within the casing 31.

Designating the direction along the rotational center line 30a of the turning arm 33 as the front-to-rear direction of the arm-turning mechanism 30, circular through-holes 34a, 35a centered around the rotational center line 30a are formed in front and rear end plate portions 34, 35 of the casing 31. A shaft member (not shown) on the rotational driving side is inserted into the casing 31 via these through-holes 34a, 35a, and is secured in a linked manner to a rotation input element of the strain wave gearing 40 housed within.

Referring to FIG. 4A and 4B, the strain wave gearing 40 comprises a rigid first internally toothed gear 41, a rigid second internally toothed gear 42, and a coupling internally toothed gear 43 disposed coaxially between the front and rear end plate portions 34, 35. The annular first internally toothed gear 41 is secured to the inner side surface of the front end plate portion 34, and the annular second internally toothed gear 42 is secured to the inner side surface of the rear end plate portion 35.

A rigid cylindrical body 44 is disposed so as to coaxially enclose the first and second internally toothed gears 41, 42. The cylindrical body 44 is rotatably supported on the external peripheral surfaces of the first and second internally toothed gears 41, 42 via front and rear bearings 45, 46. The cylindrical turning arm 33 is integrally formed on the circular external peripheral surface of the cylindrical body 44, and the coupling internally toothed gear 43 is integrally formed on the circular inner peripheral surface. The coupling internally toothed gear 43 is disposed in the middle between the first and second internally toothed gears 41, 42 in the direction of the rotational center line 30a.

A cylindrical body 50 capable of flexing in the radial direction is coaxially disposed on the inner sides of the first and second internally toothed gears 41, 42 and the coupling internally toothed gear 43. The cylindrical body 50 is disposed between the front and rear end plate portions 34, 35 so that the center axis thereof coincides with the rotational center line 30a. In the cylindrical body 50, a first externally toothed gear portion 51 capable of meshing with the first internally toothed gear 41 is formed in the front-side end in the direction of the center axis of the cylindrical body 50. A second externally toothed gear portion 52 capable of meshing with the second internally toothed gear 42 is formed in the rear-side end in the cylindrical body 50. A coupling externally toothed gear portion 53 meshingly linked with the coupling internally toothed gear 43 is formed in the middle section of the cylindrical body 50 in the direction of the center axis. A flexible externally toothed gear is formed by the first and second externally toothed gear portions 51, 52 and the coupling externally toothed gear portion 53.

A first wave generator 61 and a second wave generator 62 that rotate integrally are coaxially disposed on the inner side of the cylindrical body 50. The first externally toothed gear portion 51, made to flex into an ellipsoidal shape by the first wave generator 61, meshes with the first internally toothed gear 41 at both ends of the major axis of the ellipsoidal shape. The second externally toothed gear portion 52, made to flex into an ellipsoidal shape by the second wave generator 62, meshes with the second internally toothed gear 42 at both ends of the major axis of the ellipsoidal shape.

The first wave generator 61 comprises a rigid plug 64 formed in the front-side end of a rigid cylindrical body 63, and a wave generator bearing 65 fitted on the external peripheral surface of the rigid plug 64. The external peripheral surface of the rigid plug 64 has a profile shape defined by an ellipsoidal curve. The wave generator bearing 65 comprises flexible inner and outer races, and the profile shape of the outer race external peripheral surface has the same shape as the ellipsoidal profile shape of the rigid plug 64. Therefore, the first externally toothed gear portion 51 in which the first wave generator 61 is fitted is also made to flex into an ellipsoidal shape.

Similarly, the second wave generator 62 comprises a rigid plug 66 formed in the rear-side end of the cylindrical body 63, and a wave generator bearing 67 fitted on the external peripheral surface thereof. The external peripheral surface of the rigid plug 66 has a profile shape defined by an ellipsoidal curve. The wave generator bearing 67 comprises flexible inner and outer races, and the profile shape of the outer race external peripheral surface has the same shape as the ellipsoidal profile shape of the rigid plug 66. Therefore, the second externally toothed gear portion 52 in which the second wave generator 62 is fitted is also made to flex into an ellipsoidal shape.

A first ellipsoidal curve defining the profile shape of the rigid plug 64 and a second ellipsoidal curve defining the profile shape of the rigid plug 66 are identical ellipsoidal curves. However, the phase of the second ellipsoidal curve is rotated 90 degrees relative to that of the first ellipsoidal curve. The minor axis position of the second ellipsoidal curve coincides with the major axis position of the first ellipsoidal curve in the rotational direction centered around the rotational center line 30a, and the major axis position of the second ellipsoidal curve coincides with the minor axis position of the first ellipsoidal curve.

Therefore, the first externally toothed gear portion 51 on the front side of the cylindrical body 50 and the second externally toothed gear portion 52 on the rear side are similarly made to flex into ellipsoidal shapes of which the phases are rotated 90 degrees relative to each other. As a result, the coupling externally toothed gear portion 53 positioned between the first and second externally toothed gear portions 51, 52 is not deformed, and is kept in its initial circular cross-sectional shape. Consequently, the coupling externally toothed gear portion 53 remains meshingly linked with the coupling internally toothed gear 43.

A backup ring 70 is fitted into the inner peripheral surface of the flexible cylindrical body 50. The backup ring 70 is fitted into the inner peripheral surface portion of the coupling externally toothed gear portion 53 formed in the cylindrical body 50. The coupling externally toothed gear portion 53 is held in the shape of a perfect circle by the backup ring 70. The meshingly linked state of the coupling externally toothed gear portion 53 and the coupling internally toothed gear 43 is thereby reliably maintained.

The numbers of teeth of the gears of the strain wave gearing 40 are set, for example, as follows. The number of teeth $Z(41)$ of the first internally toothed gear 41 and the number of teeth $Z(42)$ of the second internally toothed gear 42 are the same. The number of teeth $Z(51)$ of the first externally toothed gear portion 51 and the number of teeth $Z(52)$ of the second externally toothed gear portion 52 are the same. These numbers of teeth $Z(51)$, $Z(52)$ are 2n (n being a positive integer) fewer than the numbers of teeth $Z(41)$, $Z(42)$ of the first and second internally toothed gears 41, 42. They are typically two fewer. The number of teeth $Z(43)$ of the coupling internally toothed gear 43 is the same as the number of teeth $Z(53)$ of the coupling externally toothed gear portion 53. For example, these numbers of teeth $Z(43)$, $Z(53)$ are the same as the numbers of teeth $Z(51)$, $Z(52)$ of the first and second externally toothed gear portions 51, 52.

In the arm-turning mechanism 30 with this configuration, the first and second wave generators 61, 62, which are rotation input elements, are secured in a linked manner to an input rotation shaft (not shown) such as a motor shaft. The first and second internally toothed gears 41, 42 are secured-side elements secured to the casing 31. The coupling internally toothed gear 43 is a reduced-rotation output element.

When the first and second wave generators 61, 62 rotate at a high speed, the meshing positions of the first internally toothed gear 41 and the ellipsoidally flexed first externally toothed gear portion 51 and the meshing portions of the second externally toothed gear portion 52 and the second internally toothed gear 42 move synchronously in the same circumferential direction. As a result, the cylindrical body 50 in which the first and second externally toothed gear portions 51, 52 are formed rotates at a relative rotational speed corresponding to the difference in the number of teeth, in relation to the secured first and second internally toothed gears 41, 42.

Because the coupling externally toothed gear portion 53 is meshingly linked with the coupling internally toothed gear 43, the coupling internally toothed gear 43 rotates integrally with the cylindrical body 50. Consequently, the rigid cylindrical body 44 on which the coupling internally toothed gear 43 is integrally formed and the turning arm 33 integrally formed on the cylindrical body 44 also rotates integrally with the cylindrical body 50. In the present example, the arm 33 can be turnably driven to any desired angular position within a predetermined limited angular range greater than 180 degrees, as shown in FIG. 4(A).

(Other Embodiments)

In the embodiments described above, the first and second externally toothed gear portions are made to flex into an ellipsoidal shape. Another possibility is to make the first and second externally toothed gear portions flex into three-lobed configurations. In this case, the first and second externally toothed gear portions mesh with the first and second internally toothed gears at three locations in the circumferential direction. The shapes of the 3-lobed configurations of the first and second externally toothed gear portions have a phase relationship of being rotated 60 degrees about the rotational center axis. The coupling externally toothed gear portion positioned in the middle between the first and second externally toothed gear portions is thereby held in the shape of a perfect circle without flexing. The number of teeth of the first and second externally toothed gear portions is set to 3n fewer than the number of teeth of the first and second internally toothed gears.

The invention claimed is:

1. A strain wave gearing comprising:
   a tube body capable of flexing in a radial direction;
   a first externally toothed gear portion and a second externally toothed gear portion formed in the tube body in sections set apart along a direction of a center axis of the tube body;
   a coupling externally toothed gear portion formed in the tube body between the first externally toothed gear portion and the second externally toothed gear portion in the direction of the center axis;
   a wave generator causing the tube body to flex in the radial direction so that the coupling externally toothed gear portion has a circular cross-sectional shape and the first and second externally toothed gear portions have a non-circular cross-sectional shape;
   a first internally toothed gear with which the first externally toothed gear portion flexed by the wave generator is partially meshed;
   a second internally toothed gear with which the second externally toothed gear portion flexed by the wave generator is partially meshed; and
   a coupling internally toothed gear meshingly linked through an entire periphery thereof with the coupling externally toothed gear portion.

2. The strain wave gearing according to claim 1, wherein the first internally toothed gear and the second internally toothed gear are linked together to each other so as to rotate integrally.

3. The strain wave gearing according to claim 1, comprising:
   external teeth formed in an external peripheral surface of the tube body, wherein
   one end portion in a tooth-trace direction of the external teeth is the first externally toothed gear portion and the other end thereof is the second externally toothed gear portion, and
   a middle portion in the tooth-trace direction of the external teeth is the coupling externally toothed gear portion.

4. The strain wave gearing according to claim 1, further comprising:
   a backup ring for supporting the coupling externally toothed gear portion from an inner side.

5. A strain wave gearing comprising:
   a tube body capable of flexing in a radial direction;
   a first externally toothed gear portion and a second externally toothed gear portion formed in the tube body in sections set apart along a direction of a center axis of the tube body;
   a coupling externally toothed gear portion formed in the tube body between the first externally toothed gear portion and the second externally toothed gear portion in the direction of the center axis;
   a wave generator causing the tube body to flex in the radial direction so that the coupling externally toothed gear portion has a circular cross-sectional shape and the first and second externally toothed gear portions have a non-circular cross-sectional shape;
   a first internally toothed gear with which the first externally toothed gear portion flexed by the wave generator is partially meshed;
   a second internally toothed gear with which the second externally toothed gear portion flexed by the wave generator is partially meshed; and
   a coupling internally toothed gear meshingly linked with the coupling externally toothed gear portion;
   wherein
   the first externally toothed gear portion is made to flex into a shape conforming to a first ellipsoidal curve by the wave generator,
   the second externally toothed gear portion is made to flex into a shape conforming to a second ellipsoidal curve by the wave generator, and
   a major axis position of the second ellipsoidal curve is rotated 90 degrees about the center axis relative to a major axis position of the first ellipsoidal curve.

6. The strain wave gearing according to claim 5, wherein the first and second externally toothed gear portions are equidistant from the coupling externally toothed gear portion in the direction of the center axis, and
   the first and second ellipsoidal curves are the same ellipsoidal curve with a difference in phase of 90 degrees.

7. The strain wave gearing according to claim 5, wherein the wave generator comprises a first wave generator and a second wave generator linked to each other so as to rotate integrally,
   a profile shape of the first wave generator is defined by the first ellipsoidal curve, and
   a profile shape of the second wave generator is defined by the second ellipsoidal curve.

8. The strain wave gearing according to claim 7, wherein
   a number of teeth of the first internally toothed gear and the second internally toothed gear is a first number of teeth, and
   a number of teeth of the first externally toothed gear portion and the second externally toothed gear portion is a second number of teeth 2n fewer than the first number of teeth, where n is a positive integer, and wherein
   the first and second wave generators are rotation input elements,
   the coupling internally toothed gear serves as a reduced-rotation output element when the first and second internally toothed gears are secured so as to not rotate, and
   the first and second internally toothed gears serve as reduced-rotation output elements when the coupling internally toothed gear is secured so as to not rotate.

* * * * *